(12) United States Patent
Nakamura et al.

(10) Patent No.: US 6,853,631 B1
(45) Date of Patent: Feb. 8, 2005

(54) CODE-DIVISION MULTIPLEX COMMUNICATION TRANSMITTING APPARATUS AND RECEIVING APPARATUS AND METHOD THEREOF

(75) Inventors: Michiharu Nakamura, Kanagawa (JP); Hajime Hamada, Kanagawa (JP); Yasuyuki Oishi, Kanagawa (JP); Kazuo Nagatani, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/415,997

(22) Filed: Oct. 12, 1999

(30) Foreign Application Priority Data

Feb. 25, 1999 (JP) .......................... 11-047515

(51) Int. Cl.⁷ .............................. H04B 7/216
(52) U.S. Cl. .................. 370/342; 370/320; 370/441; 370/335
(58) Field of Search ................ 370/335, 342, 370/441, 320; 375/135, 136, 137, 146, 147

(56) References Cited

U.S. PATENT DOCUMENTS

| 5,619,526 | A | 4/1997 | Kim et al. |
| 5,737,327 | A | 4/1998 | Ling et al. |
| 6,295,273 | B1 | 9/2001 | Wakabayashi |
| 6,320,842 | B1 * | 11/2001 | Mochizuki .................. 370/342 |

FOREIGN PATENT DOCUMENTS

| EP | 0 671 820 A2 | 9/1995 |
| EP | 0 718 998 A2 | 6/1996 |
| EP | 0 726 659 A2 | 8/1996 |
| EP | 0 898 379 A2 | 2/1999 |
| EP | 0 901 237 A2 | 3/1999 |
| EP | 0 957 604 A1 | 11/1999 |
| JP | 5-327654 | 12/1993 |
| JP | 8-56213 | 2/1996 |
| JP | 09-139693 | 5/1997 |
| JP | 10-336151 | 12/1998 |
| WO | 93/21699 A1 | 10/1993 |
| WO | 96/058668 A1 | 2/1996 |

* cited by examiner

*Primary Examiner*—Lester G. Kincaid
(74) *Attorney, Agent, or Firm*—Katten Muchin Zavis Rosenman

(57) ABSTRACT

A phase $\theta_{I1}, \ldots, \theta_{Q1}, \ldots$ uniquely determined for each channel is assigned to a carrier for each channel used when data $I1 \ldots, Q1, \ldots,$ to be distributed among different channels are modulated. By appropriately modifying the phase of a carrier for each channel, signal points can be located in a narrower region than in a conventional region, and thereby the difference in amplitude between a signal point with a minimum amplitude and a signal point with a maximum amplitude can be reduced. Thus, the amplitude range of a signal to be covered by an amplifier for transmitting a transmission signal is reduced, and thereby an amplifier with a linearity that is not high can be used for the amplifier. Accordingly, even if the number of signal points increase, there is no need to use a large high-power amplifier, and thereby the small power and small size of the apparatus can be realized.

8 Claims, 11 Drawing Sheets though four data series ranging from data series I1 to data series Q2 are shown in FIG. 1, there is no limitation to the # CODE-DIVISION MULTIPLEX COMMUNICATION TRANSMITTING APPARATUS AND RECEIVING APPARATUS AND METHOD THEREOF

BACKGROUND OF THE INVENTION

1. Field of the Invention

The present invention relates to code-division multiplex communications.

2. Description of the Related Art

FIG. 1 shows the configuration of the spreading unit of a conventional code-division multiplex communications system.

Data series $Data_{I1}$, $Data_{I2}$, ... $Data_{Q1}$, $Data_{Q2}$, ..., (although four data series ranging from data series I1 to data series Q2 are shown in FIG. 1, there is no limitation to the number of data series) are modulated/transmitted after being spread using the respective spreading code, and subsequently are IQ-scrambled using a scrambling code (the I signal and Q signal are scrambled using a scrambling code).

Specifically, data series I1 ($Data_{I1}$) is spread by multiplying it by a spreading code I1 in a multiplier 900-1. In the same way, data series I2 ($Data_{I2}$) is spread using a spreading code I2 in a multiplier 900-2. The data series I1 and I2 spread using different spreading codes are added in an adder 901-1, and are inputted to a multiplier 902-1 and a multifier 902-2, respectively.

Data Q1 and Q2 ($Data_{Q1}$ and $Data_{Q2}$) are multiplied by spreading codes Q1 and Q2, respectively, in multipliers 900-3 and 900-4, respectively, and are added in an adder 901-2. Then, the output of the adder 901-2 is inputted to multipliers 902-3 and 902-4. Then, in multipliers 902-1 and 902-2, the output signal is multiplied by scrambling codes $c_I$ and $c_Q$. In the same way, in multipliers 903-3 and 903-4, the output signal of the adder 901-2 is multiplied by scrambling codes $c_I$ and $c_Q$. The outputs of both multipliers 902-1 and 902-3 are inputted to an adder 903-1, and are added. The outputs of the multipliers 902-2 and 902-4 are inputted to an adder 903-2, and are added. Then, the output of the adder 903-1 is inputted to a QPSK modulator 904 as an I signal, and the output of the adder 903-2 is inputted to the QPSK modulator 904 as a Q signal.

A scrambling code is used for identifying each channel, and data I1 through Q2 are transmitted on different channels. Furthermore, a scrambling code is uniquely assigned to a user, and signals spread by the same scrambling code are outputted from one user terminal.

Since data series I1 through Q2 are put on different channels, they are multiplied by different codes I1 through Q2, respectively. However, if these data series are brought together and are transmitted from one user as one originating signal, for example, I1 and Q1, I2 and Q2 are separated into two different sets of data consisting of an I signal and a Q signal transmitted from the user, and simultaneously, scrambling codes of $c_I$ and $c_Q$ are prepared. The multiplication by a scrambling code of a signal spread by a spreading code is performed by a circuit performing an operation similar to the multiplication of a complex number when both the scrambling code and the spread signal are treated as complex signals.

Specifically, assuming that data series I1 ($D_{I1}$) and data series Q1 ($D_{Q1}$), and data series I2 ($D_{I2}$) and data series Q2 ($D_{Q2}$) are each part of a pair of complex number data, the circuit is configured so as to perform the following calculation.

$$(D_{I1}S_{I1}+jD_{Q1}S_{Q1})(c_I+jc_Q)+(D_{I2}S_{I2}+jD_{Q2}S_{Q2})($$
$$c_I+jc_Q)=(D_{I1}S_{I1}+D_{I2}S_{I2})(c_I+jc_Q)+j(D_{Q1}S_{Q1}$$
$$+D_{Q2}S_{Q2})(c_I+jc_Q)=((D_{I1}S_{I1}+D_{I2}S_{I2})c_I-(D_{Q1}S$$
$$Q1+D_{Q2}S_{Q2})c_Q)+j(D_{I1}S_{I1}30\ D_{I2}S_{I2})c_Q-(D_{Q1}S_{Q1}$$
$$+D_{Q2}S_{Q2})c_I) \quad (1),$$

wherein j is the imaginary unit, and $S_{I1}$, $S_{I2}$, $S_{Q1}$ and $S_{Q2}$ are spreading codes for I1, I2, Q1 and Q2, respectively. The data series are modulated by a QPSK modulator 904 treating the real element and imaginary element of a complex number expressed by equation (1) as an I signal and a Q signal, respectively. Since as shown in equation (1), the sign of the second term of the I signal is negative, as shown in FIG. 1, the sign of signals outputted from a multiplier 902-3 are inverted and inputted to an adder 903-1.

Although in FIG. 1 the number of channels used by one user is four, the number of elements is not limited to this number, allowing an arbitrary number of channels can be assigned to one user. In this case, too, a pair of the two data series signals of each channel are handled as a complex number, and the circuit is configured in such a way that the result of multiplication by a scrambling code, which is also handled as a complex number, may be the same as the result of multiplication between complex numbers as in equation (1).

FIG. 2 shows the configuration of a conventional receiver for receiving signals transmitted in the conventional code-division multiplex communications system shown in FIG. 1.

On a receiving side, a received signal is multiplied by the complex conjugate of a scrambling code used on a transmitting side, the multiplied signal is despread using a spreading code, thereby obtaining the original data. In the example shown in FIG. 1, data series $D_{I1}$ and $D_{Q1}$ are handled as information series to be transmitted and a pilot symbol for estimating the parameter of a propagation path, respectively. For $D_{Q1}$, a data series known in advance on the receiving side is used. The reception signal (signal despread using a spreading code $S_{Q1}$) of a pilot symbol is divided by this $D_{Q1}$, thereby obtaining the estimation value α of the parameter of a propagation path.

Specifically, a signal received by an antenna 1000 is multiplied by the complex conjugate of a scrambling code used on the transmitting side in a multiplier 1004. To multiply a signal by the complex conjugate of a scrambling code means to multiply a signal regarding two elements of the scrambling code, $c_I$ and $c_Q$, as the real and imaginary elements of one complex signal when a received signal is treated as a complex signal consisting of an I signal and a Q signal. Although the details of a circuit for performing the multiplication is not shown in FIG. 2, the fact that the conventional configuration of a digital signal process circuit can be utilized will be easily understandable to a person having an ordinary skill in the art. A symbol of (t−τ) attached to the complex conjugate $c_I−jc_Q$ of a scrambling code in FIG. 2 indicates that proper synchronous catching and synchronous holding are performed, and the received signal and the complex conjugate of a scrambling code are multiplied while being synchronized. τ indicates a delay in phase. If (t−τ) is attached to the symbol, etc., of a scrambling code or a spreading code like this, it means that synchronization is performed along with the multiplication of a code by way of a proper timing adjustment.

After the received signal is multiplied by the complex conjugate of a scrambling code in the multiplier 1004 and scrambling of it is cancelled, the cancelled signal is branched and is multiplied by a spreading code I1 in a multiplier 1005-1. Thus data I1 are demodulated. In a multiplier 1005-2, the received signal is multiplied by a spreading code Q1, thus data Q1 are demodulated. It is assumed here that data Q1 are pilot signals (pilot symbols). A pilot signal is a signal known on the receiving side which is predetermined in a system. The demodulated pilot signal is inputted to a divider 1007, and is divided by the symbol $D_{Q1}$ of a predetermined pilot signal prior to transmission. By such a process, a value indicating the degree of fluctuation against its original signal due to fading of a received pilot signal, specifically both the degree of fluctuation of its amplitude and the degree of rotation of its phase, is calculated. The operation result is treated as the estimated value $\alpha$ of a channel estimation, and its complex conjugate is inputted to a multiplier 1006. The demodulated data signal $D_{I1}$ is also inputted to the multiplier 1006, and the phase rotation caused in a transmission line is compensated for by multiplying $D_{I1}$ by the complex conjugate of the estimation value $\alpha$. In this way, phase rotation is compensated for, and simultaneously a data signal $D_{I1}$ with an amplitude value that fluctuates according to the amplitude fluctuation ratio of the pilot signal is inputted to a RAKE combiner 10002, and is combined with the signal of another path inputted from a despreading unit 1001-2 having the same configuration as a despreading unit 1001-1. The RAKE-combined signal is inputted to a signal decision unit 1003, and its signal value is determined in such a form where a noise, etc., is eliminated.

Although for RAKE-reception, only two of the despreading units for multi-path reception are described in FIG. 2, there is also a configuration such that more despreading units are provided, thereby allowing more multi-paths to be received.

FIG. 3 shows the amplitude-phase diagram (constellation) of a signal transmitted in the conventional code-division multiplex communications system shown in FIG. 1. In this example, data series $Data_{I1}$, $Data_{I2}$, $Data_{Q1}$ and $Data_{Q2}$ have the same amplitude of ±1. Since in this case, a transmission signal is obtained by multiplexing the four data series, the signal has an amplitude of $2\sqrt{2}$ at one instant, an amplitude of 2 at another instant and no amplitude at another instant. If a signal with a large maximum-to-minimum ratio or a signal with a large maximum amplitude compared with average power, is amplified by an amplifier, a high linearity is required for the input/output characteristic of an amplifier. Generally speaking, an amplifier with a highly linear input/output characteristic has low efficiency, a signalling system in which the fluctuation of an amplitude is small and a ratio of the maximum amplitude to average power is small, is desirable from the viewpoints of both power efficiency and heat generation.

SUMMARY OF THE INVENTION

An objective of the present invention is to provide a signal generation apparatus and a method thereof for reducing the amplitude fluctuation of a transmission signal in a code-division multiplex communications system.

A transmitting apparatus in the first aspect of the present invention used in a code-division multiplex communications system where a plurality of data series are spread/despread using a plurality of spreading codes and are transmitted/received, comprises a spreading unit spreading a plurality of data series using a different spreading code for each data series, a scrambling unit scrambling the plurality of spread signals obtained by the spreading unit using a scrambling code uniquely assigned to each user and a modulation unit modulating the output of the scrambling unit with a different phase for each data series.

A transmitting apparatus in the second aspect of the present invention used in a code-division multiplex communications system where a plurality of data series are spread/despread using a plurality of spreading codes and are transmitted/received, comprises a spreading unit spreading a plurality of data series using a different spreading code for each data series and a modulation unit modulating the plurality of spread signals obtained by the spreading unit with a carrier with a phase that is individually assigned to each data series.

A transmitting apparatus in the third aspect of the present invention used in a code-division multiplex communications system where a plurality of data series are spread/despread using a plurality of spreading codes and are transmitted/received, comprises a spreading unit spreading a plurality of data series using a different spreading code for each data series, a phase modulation unit individually modulating the phases of the plurality of spread signals obtained by the spreading unit for each data series, a signal combination unit combining signals of each data series outputted from the phase modulation unit, a scrambling unit scrambling the combined signal outputted by the signal combination unit using a scrambling code uniquely assigned to each user and a modulation unit modulating the signal outputted by the scrambling unit with a carrier of a prescribed frequency.

A transmitting apparatus in the fourth aspect of the present invention used in a code-division multiplex communications system where a plurality of data series are spread/despread using a plurality of spreading codes and are transmitted/received, comprises a spreading unit spreading a plurality of data series using a different spreading code for each data series, a phase modulation unit individually modulating the phases of the plurality of spread signals obtained by the spreading unit for each data series, a signal combination unit combining signals of each data series outputted from the phase modulation unit and a modulation unit modulating the signal outputted by the scrambling unit with a carrier of a prescribed frequency.

A receiving apparatus in the first aspect of the present invention used in a code-division multiplex communications system where a plurality of data series are spread/despread using a plurality of spreading codes and are transmitted/received, comprises a reverse scrambling unit reversely scrambling the scrambled signal by a scrambling code of a received signal, a despreading unit despreading the signal obtained by the reverse scrambling unit, a pilot signal extraction unit extracting a pilot signals from the output signal of the despreading unit, a channel estimation unit calculating a channel estimation value from the pilot signal, a phase difference information storage unit storing information about the phase difference of the data signals outputted from the despreading unit, a channel estimation value correction unit correcting the phase of the channel estimation value based on the phase difference information, a compensation unit compensating for the phase of the data signal based on the channel estimation value corrected by the channel estimation value correction unit and a decision unit determining the signal value of the received data signal based on a signal generated by the compensation unit.

A receiving apparatus in the second aspect of the present invention used in a code-division multiplex communications system where a plurality of data series are spread/despread using a plurality of spreading codes and are transmitted/received, comprises a despreading unit despreading received signals, a pilot signal extraction unit extracting a pilot signals from the output signal of the despreading unit, a channel estimation unit calculating a channel estimation value from the pilot signal, a phase difference information storage unit storing information about the channel phase difference of the data signal outputted by the despreading unit and a decision unit determining the signal value of the data signal based on the result obtained by processing the data signal using both the channel estimation value and the phase difference information.

According to the present invention, since the phase of a carrier for modulating each data series is individually set for each data series and is transmitted, the combined modulation signal of each data series is distributed to and located in a narrow region compared with the conventional one if the signal is plotted on an I-Q plane. Therefore, if this location is optimized by appropriately adjusting the phase, the difference in amplitude between a signal representing the maximum amplitude and a signal representing the minimum amplitude of the signals located on the I-Q plane can be reduced, and simultaneously, the maximum amplitude can also be reduced compared with the conventional one. Therefore, the linearity of an amplification characteristic required by a power amplifier usually installed in a transmitter and used to amplify the output power of a transmission signal can be relaxed. Accordingly, a small-size amplifier with small output power can be used, which greatly contributes to both the low power and small size of the apparatus.

Since the phase of a carrier for each channel is predetermined in a system and information about the phase difference between a carrier for a channel for transmitting a pilot symbol and a carrier for a channel for transmitting each data series is stored, the compensation of a phase rotation due to fading of a receiving data signal by way of channel estimation performed during data reproduction can be performed normally on the receiving side. Therefore, even if the phase of a carrier for each channel is individually set, data can be received normally.

DESCRIPTION OF THE PREFERRED EMBODIMENTS

Figure 4:
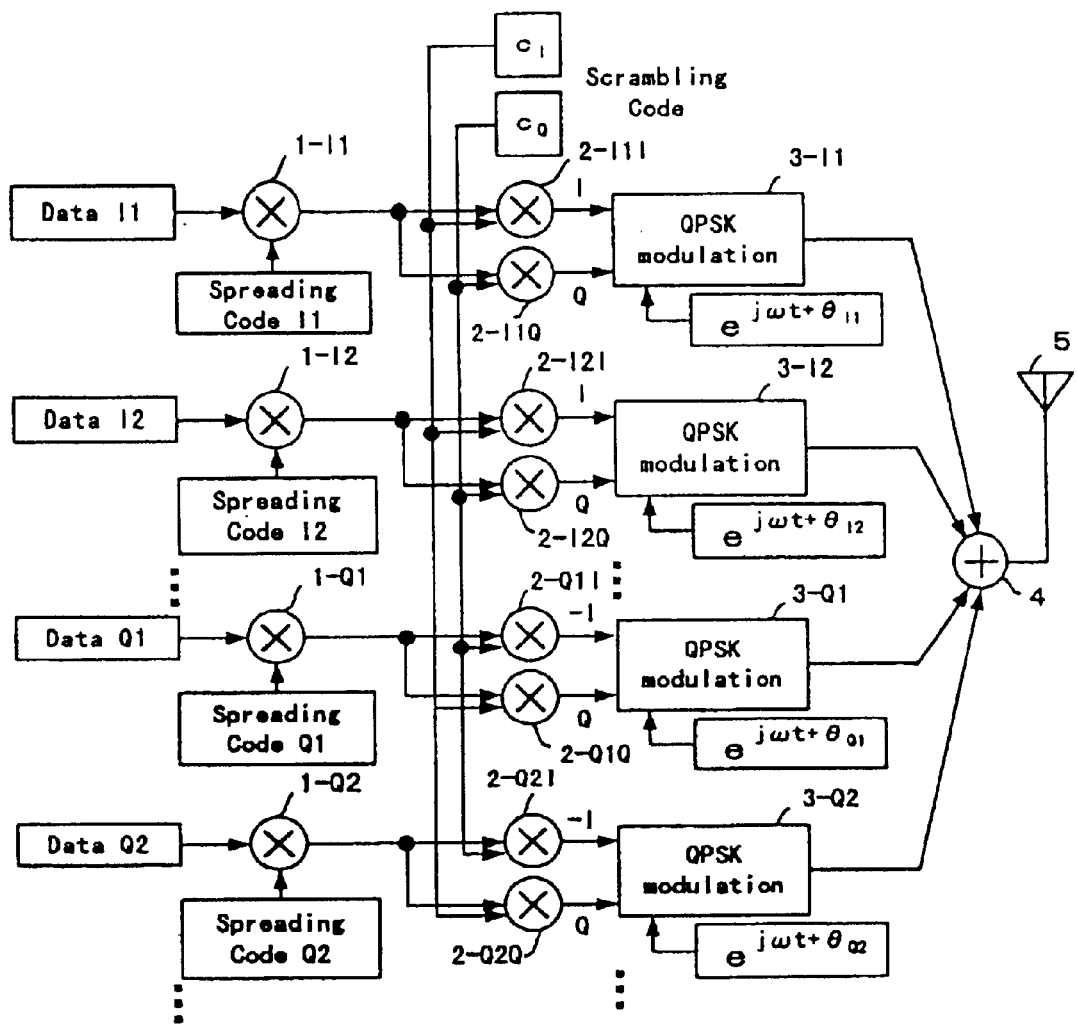
FIG. 4 shows the configuration of one preferred embodiment of the transmitter of the present invention.

FIG. 4 shows the configuration of one preferred embodiment of the transmitter of the present invention.

After being spread-modulated and IQ-scrambled, data series are modulated by orthogonal modulators with carrier phases that are $\theta_{I1}, \theta_{I2}, \ldots, \theta_{Q1}, \theta_{Q2}, \ldots$. Although carrier phases $\theta_{I1}, \theta_{I2}, \ldots, \theta_{Q1}, \theta_{Q2}, \ldots$, can be arbitrarily determined, in the preferred embodiment shown in FIG. 4, in particular, $\theta_{I1}, \theta_{I2}, \ldots, \theta_{Q1}, \theta_{Q2}, \ldots$, correspond to spreading codes $S_{I1}, S_{I2}, \ldots, S_{Q1}, S_{Q2}, \ldots$, respectively.

Data I1 are multiplied by a spreading code I1 in a multiplier 1-I1. In the same way, data I2, ..., dataQ1 and dataQ2, ..., are multiplied by spreading codes I2, ..., Q1, Q2, ..., in multipliers 1-I2, ..., 1-Q1, 1-Q2, ..., respectively. Each of dataI1, I2, ..., Q1, Q2, ..., indicates the data of a different channel. Then, each of data I1, I2, ..., Q1, Q2, ..., spread by spreading codes is branched into two groups, which are multiplied by scrambling codes $c_I$ and $c_Q$, respectively, in multipliers 2-I1I, 2-I1Q, 2-I2I, 2-I2Q, ..., 2-Q1I, 2-Q1Q, 2-Q2I, 2-Q2Q, ..., respectively. Then, the output of the multipliers 2-I1I and 2-I1Q, the output of the multipliers 2-I2I and 2-I2Q, ..., the output of the multipliers 2-Q1I and 2-Q1Q, the output of the multipliers 2-Q2I and 2-Q2Q and so forth, are phase-modulated by QPSK modulators 3-I1, 3-I2, ..., 3-Q1, 3-Q2, ..., respectively. At this time, a carrier with a different phase is inputted to the QPSK modulators 3-I1, 3-I2, ..., 3-Q1, 3-Q2, ..., and each data series is modulated with the corresponding carrier. The signals modulated by modulators with different phases are summed up by an adder 4, and are transmitted from an antenna 5.

In this preferred embodiment, the circuit is configured in such a way that a transmission signal is generated by the following operation of complex numbers.

$$\{D_{I1}S_{I1}(c_I+jc_Q)\exp(j\theta_{I1})+D_{I2}S_{I2}(c_I+jc_Q)\exp(j\theta_{I2})+ \ldots \\ +D_{Q1}S_{Q1}(c_I+jc_Q)\exp(j\theta_{Q1})+D_{Q2}S_{Q2}(c_I+jc_Q)\exp(j\theta_{Q2})+ \ldots \}\exp(j\omega t),$$

wherein exp (jωt) indicates the carrier of anguler frequency ω.

Figure 5:
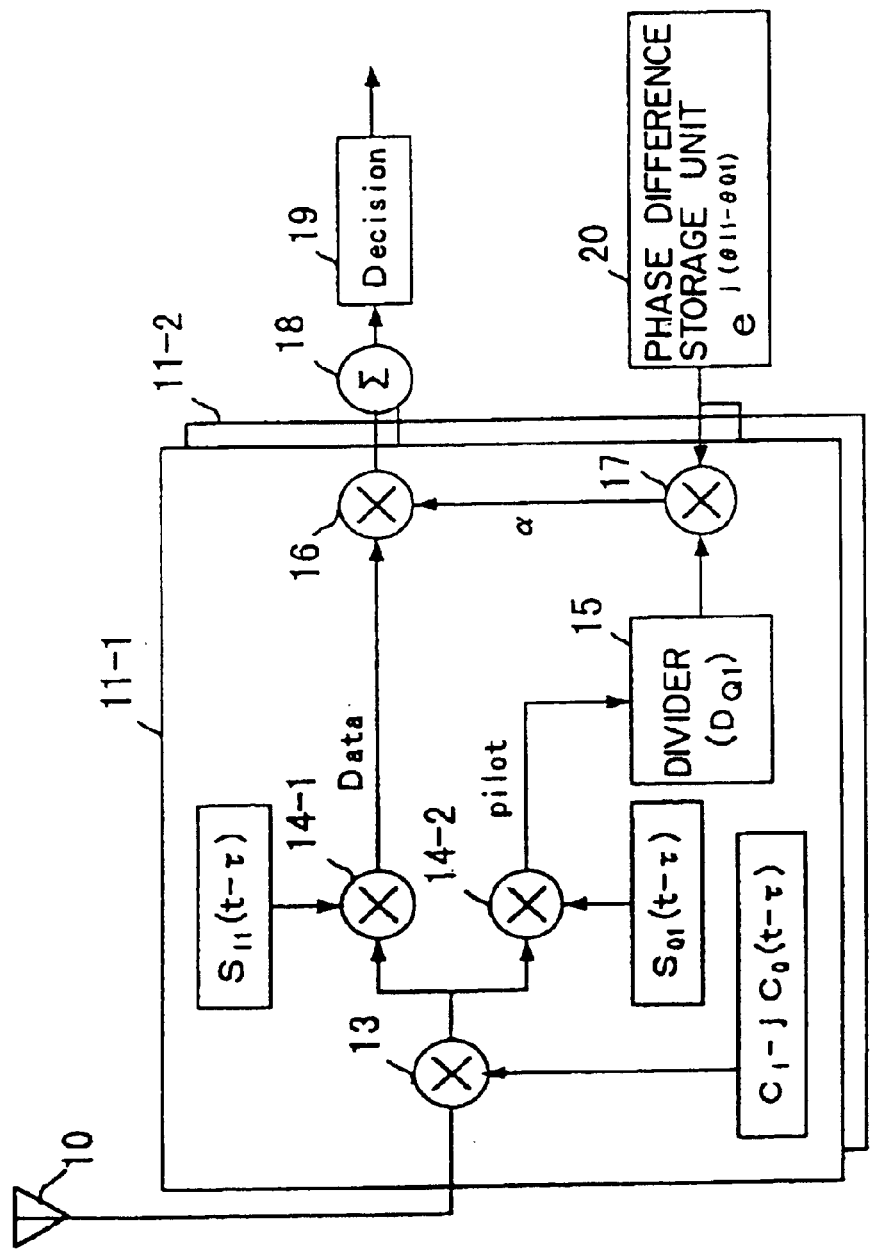
FIG. 5 shows the configuration of one preferred embodiment of the receiver of the present invention.

FIG. 5 shows the configuration of one preferred embodiment of the receiver of the present invention, and it shows a circuit for demodulating the modulated signals of data series $D_{I1}, D_{Q1}$ transmitted from the transmitter shown in FIG. 4.

In this preferred embodiment, the channel estimation value of a propagation path is corrected using the phase difference (in the example of FIG. 5, $\theta_{I1}-\theta_{Q1}$) of each spreading code. If $\theta_{I1}, \theta_{I2}, \ldots, \theta_{Q1}, \theta_{Q2}, \ldots$ are assigned in such a way that the phase difference between a plurality of spreading code channels transmitted to the same station may become 0, the correction of $\theta_{I1}-\theta_{Q1}$ is not required. The value of a phase term to be corrected by a spreading code is set corresponding to a spreading code to be used, and it can be set as a known value on the receiving side.

The phase of the carrier of a signal transmitted by the transmitter shown in FIG. 4 is uniquely determined by way of a channel determined by a spreading code. A receiver receives signals with an antenna 10, the received signal is converted from an RF band signal to a baseband signal by a baseband signal demodulation circuit, which is not shown in FIG. 5, and the converted signal is inputted to despreading units 11-1 and 11-2 shown in FIG. 5. The despreading units 11-1 and 11-2 are provided to RAKE-receive signals. The baseband signal is inputted to a multiplier 13, and in the multiplier 13, the signal is synchronized with and multiplied by the complex conjugate of a scrambling code ($c_I-jc_Q(t-\tau)$) predetermined for each user. Thus, the scrambling is cancelled and the output signal of the multiplier 13 becomes a signal spread only by a spreading code. Then, in order to extract the signals of data series $D_{I1}$ and $D_{Q1}$, the output signal of the multiplier 13 is multiplied by spreading codes I1 and Q1 at an appropriate timing in multipliers 14-1 and 14-2, respectively. The data series signal obtained by the despreading using the spreading code I1 is extracted as a data signal and is inputted to a multiplier 16. The data series signal obtained by the despreading using the spreading code Q1, in FIG. 5, is extracted as a pilot signal, and is inputted to a divider 15. In the divider 15, the received pilot signal is divided by a known pilot symbol $D_{Q1}$, and the division result is acquired as a channel estimation value α, which is an index for indicating the degree of fluctuation of a pilot symbol $D_{Q1}$ in a propagation path. Then, the channel estimation value α is inputted to a multiplier 17, and in the multiplier 17, the phase difference $\theta_{I1}-\theta_{Q1}$ between the carrier of a channel for the spreading code I1 and the carrier of a channel for the spreading code Q1 is added to the phase using the value of $\exp(j(\theta_{I1}-\theta_{Q1}))$ stored in a phase difference storage unit 20. After the phase difference supplied to the carrier of a channel for the spreading code Q1 is corrected against the carrier of a channel for the spreading code I1 supplied on the transmitting side in this way, the complex conjugate of the phase-corrected channel estimation value α is inputted to a multiplier 16, and in the multiplier 16, the data signal outputted from the multiplier 14-1 is multiplied by the complex conjugate. The phase rotation caused in a transmission line of the data signal is compensated for by multiplying the data signal by the phase-corrected channel estimation value α supplied at the time of transmission, and the data signal is inputted to a RAKE combination unit 18. The RAKE combination unit 18 RAKE-combines signals received from a plurality of despreading units 11-1 and 11-2 (not limited to two) and outputs the combined signal to a signal decision unit 19. The signal decision unit 19 determines a data signal value based on the inputted signal with a noise that is suppressed.

The carriers of signals transmitted according to the preferred embodiment shown in FIG. 4 have different phases for each channel (spreading code). Therefore, on the receiving side, after signals of each channel are converted to baseband signals, first, the phase difference existing between a pilot signal and data signal of each channel must be cancelled, and then the phase fluctuation of the data signal occurring in the transmission line must be compensated for. Since the relationship between each channel (spreading code) and a phase value provided to its carrier is predetermined, the phase difference between the data signal obtained by the despreading unit 11-1 and a pilot signal obtained by the despreading unit 11-2 can be obtained in advance on the receiving side. By storing this phase difference in a phase difference storage unit 20 consisting of a memory, etc., and correcting the phase of a channel estimation value α obtained by the divider 15 using the stored value, the desired channel estimation value α can finally be obtained.

Figure 6:
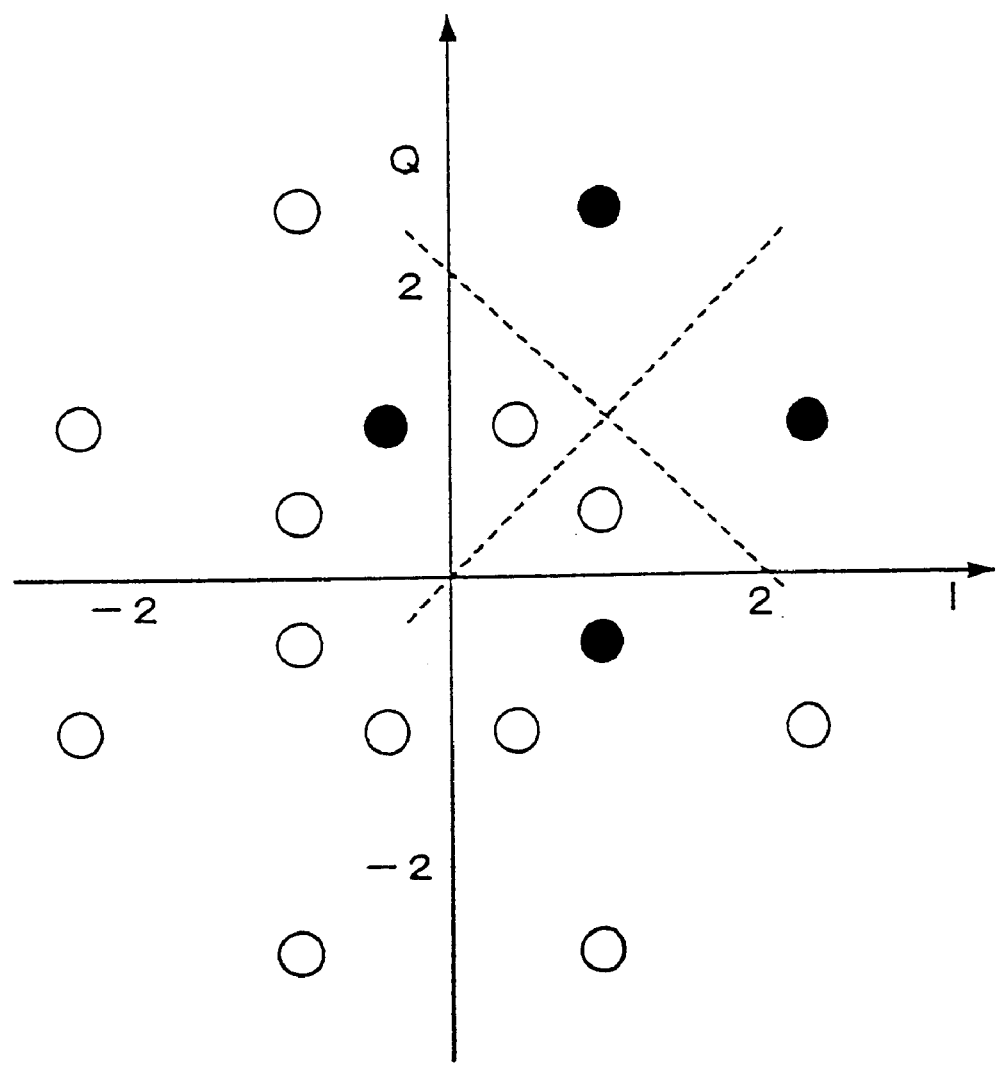
FIG. 6 shows an example of the amplitude-phase diagram (constellation) of a signal transmitted in the code-division multiplex communications system of the present invention.

FIG. 6 shows an example of the amplitude-phase diagram (constellation) of a signal transmitted in the code-division multiplex communications system of the present invention.

This example shows a case where four spreading codes $S_{I1}$, $S_{Q1}$, $S_{I2}$ and $S_{Q2}$ are assigned to one user and phase differences are set to satisfy $\theta_{I1}=\theta_{Q1}=0$ degrees and $\theta_{I2}=\theta_{Q2}=45$ degrees. In this case, a signal point has two amplitudes: one is $\sqrt{(1+\sqrt{2})}$ and the other is $\sqrt{(\sqrt{2}-1)}$. Its average power is the same as the average power described in the prior art. As shown in FIG. 6, a signal with an amplitude fluctuation that is small and with a maximum amplitude that is small compared with the conventional system, can be obtained. Such a signal relaxes the requirement of the linearity of an amplifier, and it thereby contributes to the improvement of the power efficiency and miniaturization of the apparatus.

In FIG. 6, the intersection point of dotted lines is one of the signal points with amplitude 1, obtained by QPSK modulation in a reference phase in the case $\theta_{I1}=\theta_{Q1}=0$ degrees. Signal points obtained by adding 4 kinds of signal points with amplitude 1, which are placed on the I axis and Q axis and are obtained by QPSK modulation with $\theta_{I2}=\theta_{Q2}=45$ degrees, are indicated by black points. The signal decision unit 19 of the receiver shown in FIG. 5 determines 16 signals shown in FIG. 6. Thus, the position of signal points on the I-Q plane of a QPSK modulation can be modified by differentiating between the phases of carriers for the channels. Therefore, by individually and properly modifying the phase of a carrier for each channel in such a way that signal points can be appropriately located on the I-Q plane, both the maximum instantaneous value and the amplitude fluctuation of a transmission signal can be suppressed to a low level, and thereby a power amplifier can be miniaturized, thereby preventing the waste of power due to the use of a large high-powered power amplifier.

In FIG. 6, a case where the number of data series to be multiplexed is four of I1, Q1, I2 and Q2, is described.

If the number of data series to be multiplexed is two or more and if there are the same phases or phases with values that are close to phases $\theta_{I1}, \theta_{I2}, \ldots, \theta_{Q1}, \theta_{Q2}, \ldots$, the amplitude of a signal obtained by combining signals modulated with these phases becomes large. Therefore, by distributing the phases $\theta_{I1}, \theta_{I2}, \ldots, \theta_{Q1}, \theta_{Q2}, \ldots$, at equal intervals, the maximum amplitude of a transmission signal can be suppressed to a low level. If n pieces of data series are multiplexed and if $\theta_{I1}, \theta_{I2}, \ldots, \theta_{In}$ and $\theta_{Q1}, \theta_{Q2}, \ldots, \theta_{Qn}$ are assumed to be $0, \pi/2n, 2\pi/2n, 3\pi/2n, \ldots, (n-1)\pi/2n$, the maximum amplitude of the transmission signal can be suppressed to a minimum level. However, it is not limited to this phase assignment, and even if two kinds of phases of 0 and 45 degrees, or three kinds of phases of 0, 30 and 60 degrees are used for reasons relating to a modulator, the maximum amplitude of a transmitter can be suppressed to a low level compared with the conventional method in which all data series are modulated with the same phase.

Figure 7:
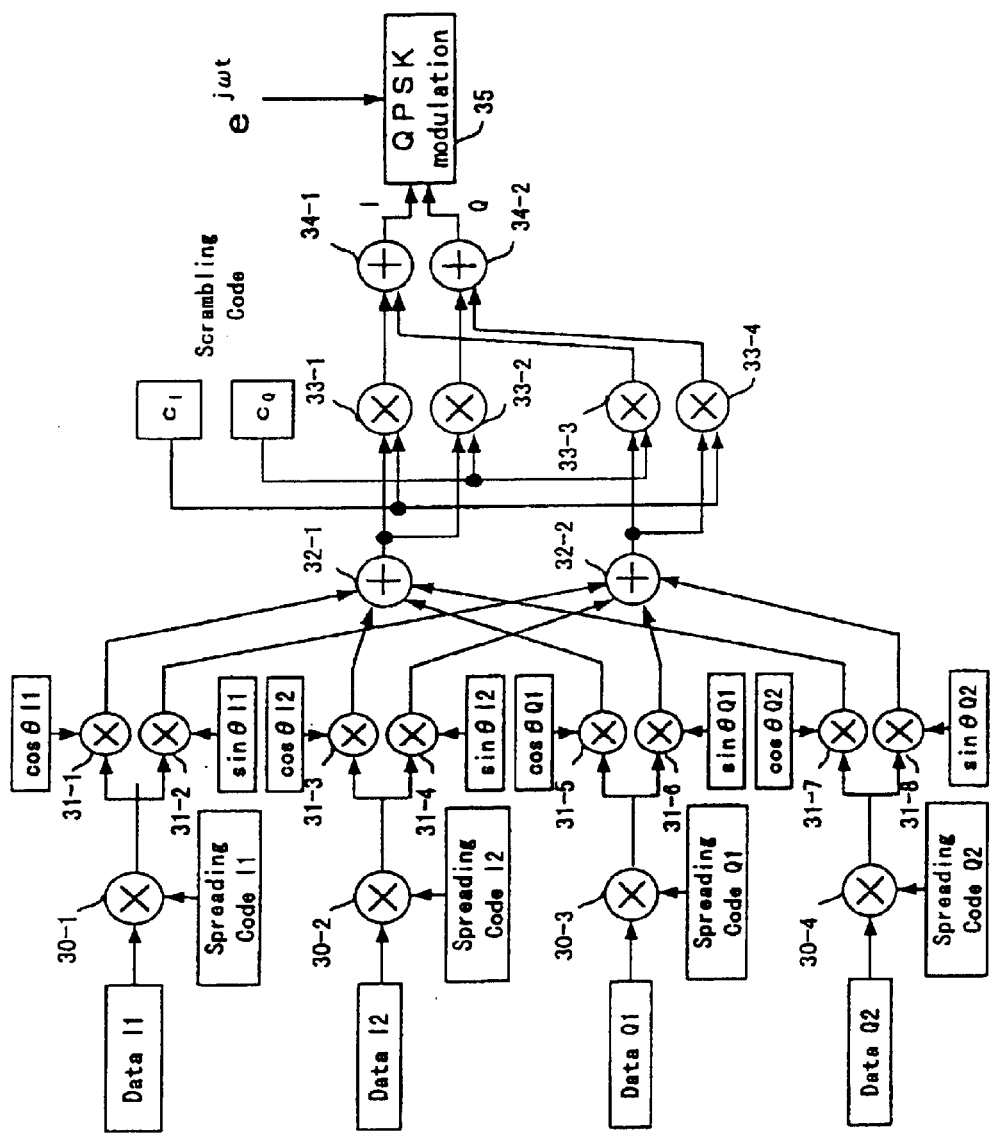
FIG. 7 shows the configuration of another preferred embodiment of the transmitter of the present invention.

FIG. 7 shows the configuration of another preferred embodiment of the transmitter of the present invention.

As shown in FIG. 7, if after data series I1, I2, Q1 and Q2 have been spread-modulated with corresponding spreading codes $S_{I1}, S_{I2}, S_{Q1}$ and $SQ_2$, phases $\theta_{I1}, \theta_{I2}, \ldots, \theta_{Q1}, \theta_{Q2}, \ldots$, are added to the phases of signals obtained by the spread-modulation, the number of orthogonal modulators can be reduced.

In FIG. 7, in order to simplify the description, a transmitter for transmitting four channels of data I1 to Q2 is exemplified. Data I1 to data Q2 are multiplied by and spread using spreading codes I1 to Q2 in multipliers 30-1 to 30-4. Then, the data I1 to Q2 spread using and modulated with the spreading codes become spread signals, and are branched into two groups and individually pre-assigned phases are added to those phases by multipliers 31-1 to 31-8. Then, the signals spread with these supplied phases are added in adders 32-1 and 32-2, multiplied by scrambling codes $c_I$ and $c_Q$ multipliers 33-1 to 33-4, respectively, and then are added in adders 34-1 and 34-2, respectively. Then, the addition result of the adders 34-1 and 34-2 are inputted to a QPSK modulator 35 as I and Q signals, respectively. The QPSK modulator 35 QPSK-modulates the inputted I and Q signals and outputs the signals to a power amplifier, which is not shown in FIG. 7.

The circuit shown in FIG. 7 is configured so as to realize the following complex operation. Provided, however, that in equation (2), j, $S_{I1}$ to $S_{Q2}$ and exp (jωt) are the imaginary unit, spreading codes and the complex function expression of a carrier (expression by Euler's formula), respectively.

$$\{D_{I1}S_{I1}(c_I+jc_Q)\exp(j\theta_{I1})+D_{I2}S_{I2}(c_I+jc_Q)\exp(j\theta_{I2})+D_{Q1}S_{Q1}(c_I+jc_Q)\exp(j\theta_{Q1})+D_{Q2}S_{Q2}(c_I+jc_Q)\exp(j\theta_{Q2})\}\exp(j\omega t)=\{D_{I1}S_{I1}(\cos\theta_{I1}+j\sin\theta_{I1})+D_{I2}S_{I2}(\cos\theta_{I2}+j\sin\theta_{I2})+D_{Q1}S_{Q1}(\cos\theta_{Q1}+j\sin\theta_{Q1})+D_{Q2}S_{Q2}(\cos\theta_{Q2}+j\sin\theta_{Q2})\}$$

$$(c_I+jc_Q)\exp(j\omega t) \qquad (2)$$

Figure 8:
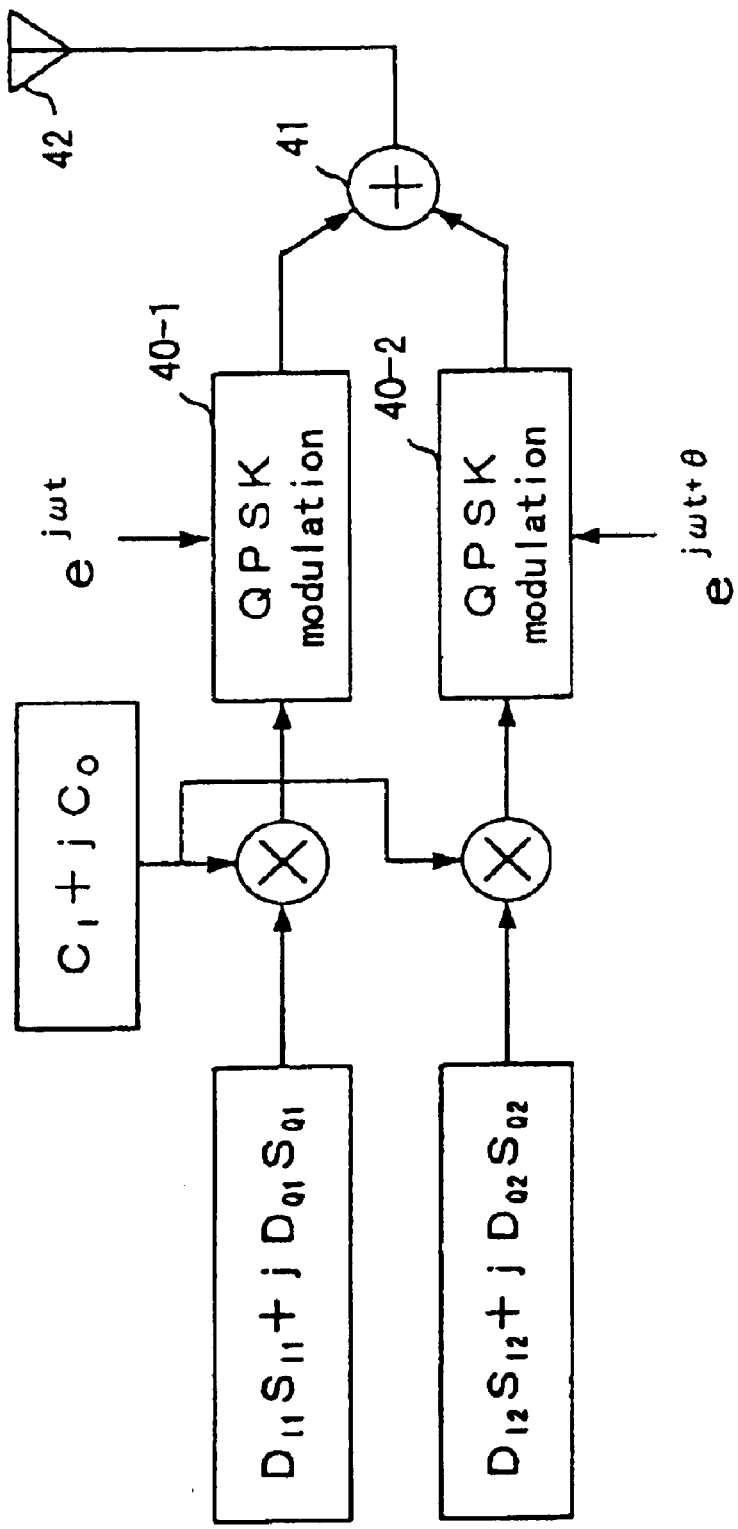
FIG. 8 shows the configuration of another preferred embodiment of the transmitter of the present invention.

FIG. 8 shows the configuration of another preferred embodiment of the transmitter of the present invention.

In this preferred embodiment, $\theta_{I1}=\theta_{Q1}=0$ degrees and $\theta_{I2}=\theta_{Q2}=\theta$ must be satisfied. The configuration shown in FIG. 8 is for a case where a phase supplied to data I1 and Q1 is 0 degree and the value of a phase provided to data I2 and Q2 is θ. In this way, by dividing data into two series like this, products are obtained by multiplying and combining data signals $D_{I1}$ and $D_{Q1}$ by spreading codes $S_{I1}$ and $S_{Q1}$, The two combination are treated as two complex numbers $D_{I1}S_{I1}+jD_{Q1}S_{Q1}$ and $D_{I2}S_{I2}+jD_{Q2}S_{Q2}$, and these complex numbers are multiplied by scrambling codes $(c_I+jc_Q)$, which are also complex numbers, and the data are modified by QPSK modulators 40-1 and 40-2 in such a way that the phases of the carriers of the two series may differ from each other. The phase of the carrier of the QPSK modulator 40-1 is 0 degrees, and the value of the phase of the carrier of the QPSK modulator 40-1 is θ. According to such a configuration, the number of QPSK modulators can be reduced to two, which is half of the number in the preferred embodiment shown in FIG. 4. The modulated signals outputted from the QPSK modulators 40-1 and 40-2 are added in an adder 41, and are outputted as radio waves from an antenna 42 through the power amplifier, which is not shown in FIG. 8.

Figure 9:
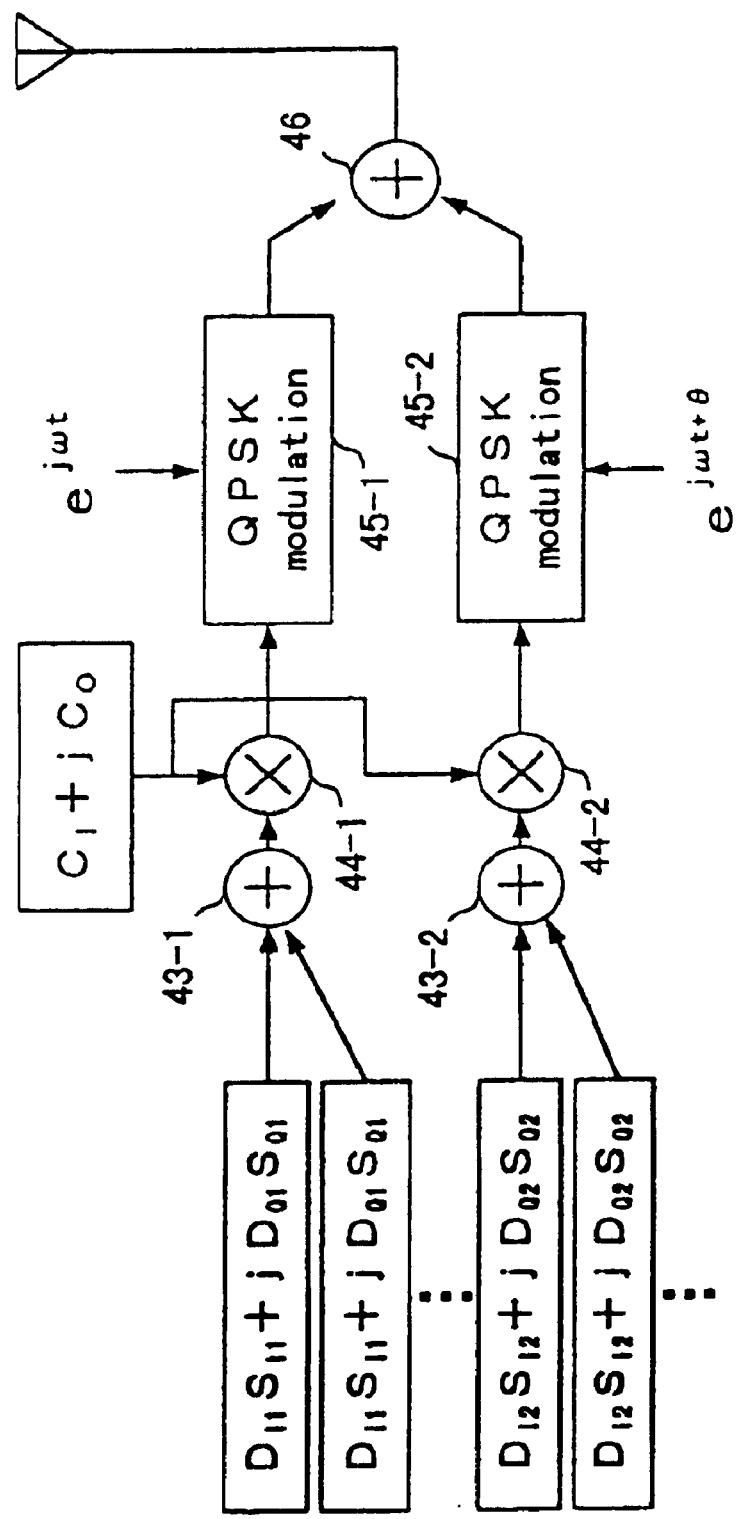
FIG. 9 shows the configuration in the case where the number of data series to be multiplexed increases in the preferred embodiment shown in FIG. 8.

FIG. 9 shows the configuration in the case where the number of data series to be multiplexed increases in the preferred embodiment shown in FIG. 8.

Figure 1:
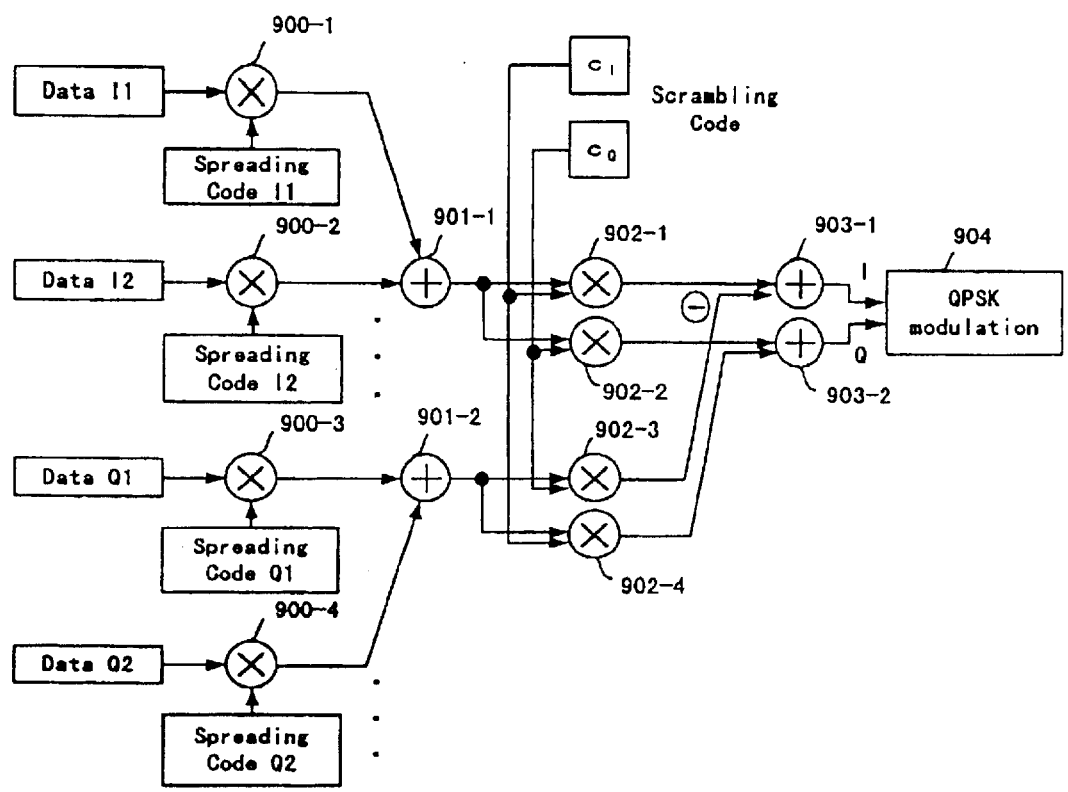
FIG. 1 shows the configuration of the spreading unit of a conventional code-division multiplex communications system.
Figure 2:
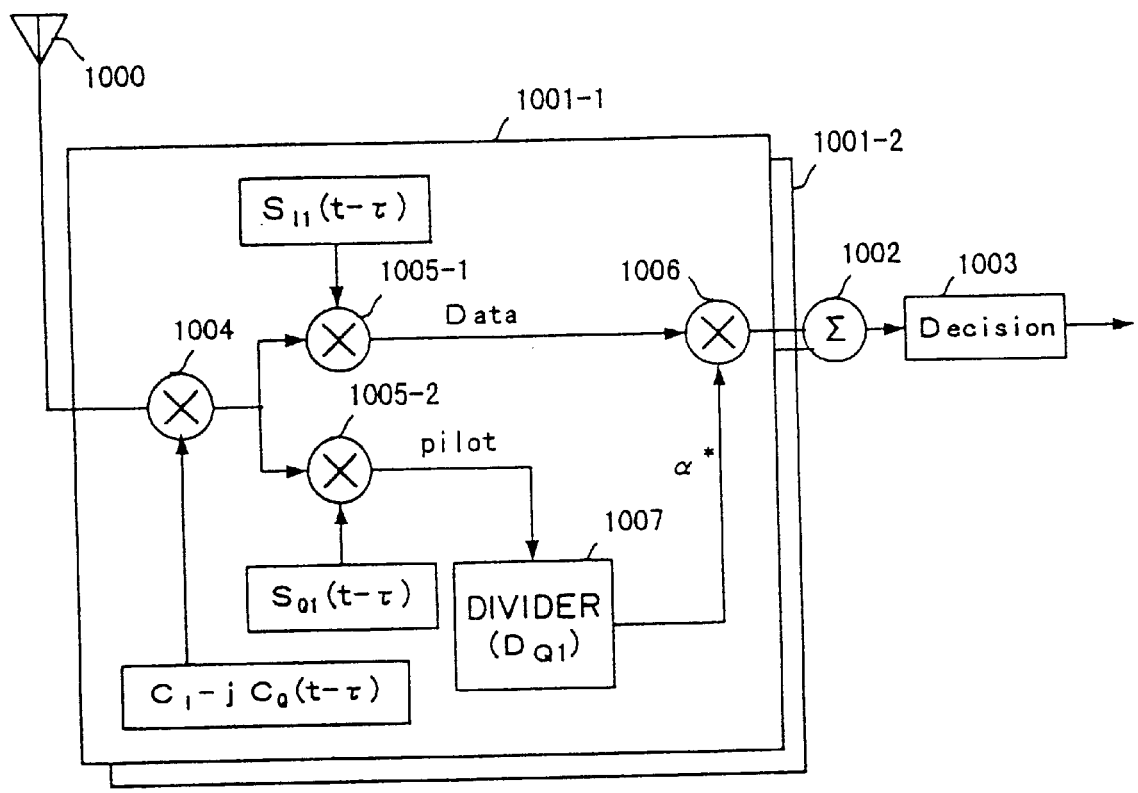
FIG. 2 shows the configuration of a conventional receiver.
Figure 3:
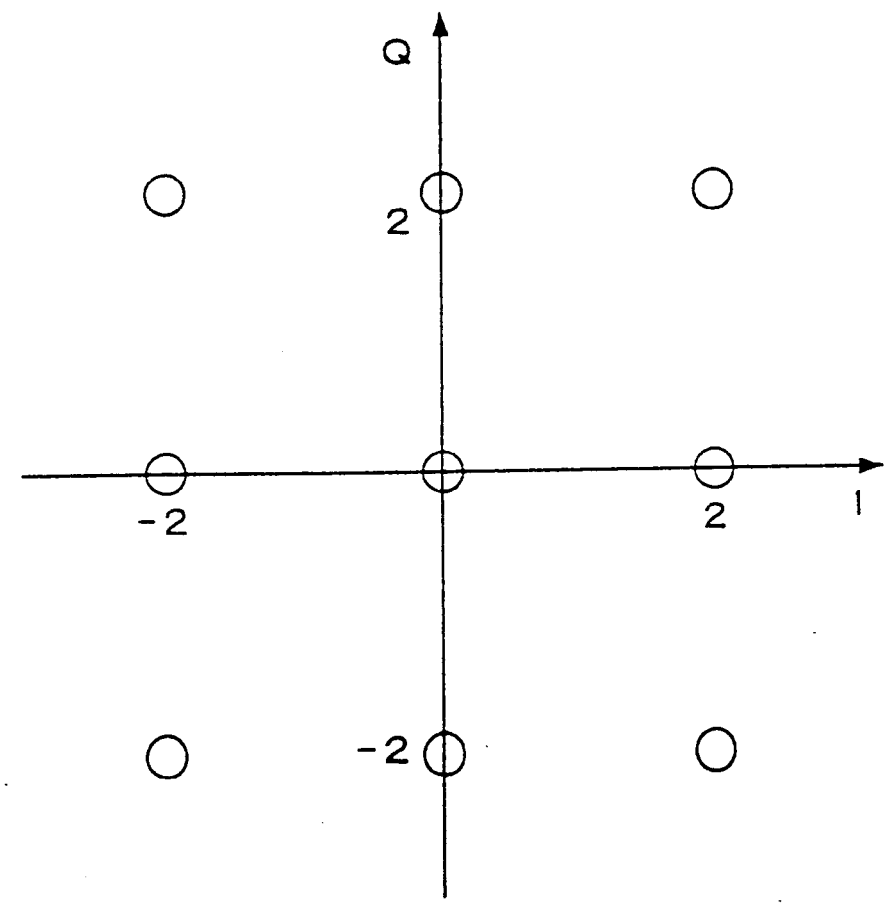
FIG. 3 shows the amplitude-phase diagram (constellation) of a signal transmitted in a conventional code-division multiplex communications system.

According to the configuration shown in FIG. 9, when the number of data series to be multiplexed increases, the number of both the orthogonal modulators and phase multipliers may be less than the number in the preferred embodiment shown in FIG. 1.

In FIG. 9, data series are classified into two groups: one group in which the phase of its carrier is 0 degrees and the other group in which the value of the phase of its carrier is θ. After being summed up in advance in an adder 43-1, the data series group in which the phase of its carrier is 0 degrees, is scramble-modulated and QPSK-modulated in a multiplier 44-1 and a QPSK modulator 45-1, respectively, in the same way as in the preferred embodiment shown in FIG. 5 and is inputted to an adder 44. After being summed up in advance in an adder 43-2, the data series group in which the value of the phase of its carrier is 0, is scramble-modulated and QPSK-modulated in a multiplier 44-2 and a QPSK modulator 45-2, respectively, in the same way as in the preferred embodiment shown in FIG. 5 and is inputted to an adder 46. The adder 46 adds modulated signals inputted from the QPSK modulators 45-1 and 45-2, and outputs the addition result to a power amplifier, which is not shown in FIG. 9.

Figure 10:
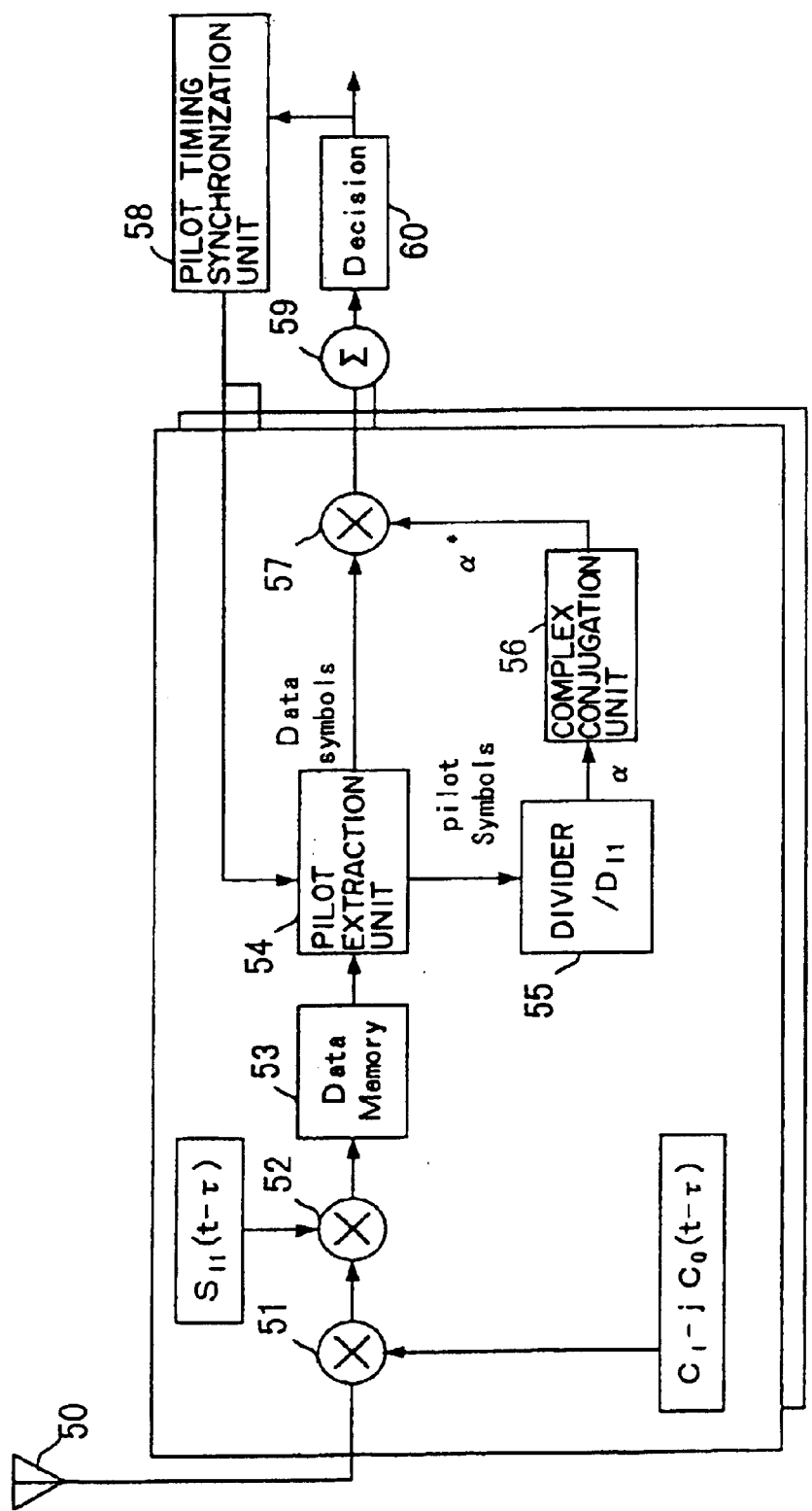
FIG. 10 shows the configuration of the preferred embodiment of a receiver in the case where a time-division multiplex pilot symbol is used.

FIG. 10 shows the configuration of the preferred embodiment of a receiver in the case where a time-division multiplex pilot symbol is used.

In a system where pilot signals (pilot symbols) are spread using the same spreading codes as data series signals and are multiplexed by way of time-division together with data signals, the pilot signal part must be extracted from received signals by detecting frame-synchronization with the received signals.

In FIG. 10, after being converted from RF band signals to baseband signals, signals received by an antenna 50 are inputted to a multiplier 51, which is not shown in FIG. 10. In the multiplier 51, the received pilot signal is multiplied by a scrambling code $(c_I-jc_Q(t-\tau))$ at the timing of detection (scrambling cancellation). Then, in a multiplier 52, the multiplication result of the multiplier 51 is multiplied by a spreading code $S_{I1}(t-\tau)$ (reverse spreading), and the pilot signal is restored to the original state. After being temporarily stored in a data memory 53, the restored pilot signal is read by a pilot extraction unit. After that, in the multipliers 51 and 52, both the scrambling cancellation and despreading of received data series are performed, and restored data series signals are stored in a data memory 53 in the same way. The pilot extraction unit 54 extracts the time-division-multiplexed pilot from the data memory 53 based on a synchronous signal inputted from a pilot timing synchronization unit 58. Then, the pilot extraction unit 58 reads data signals other than the pilot signals from the data memory 53, and the data signals are outputted to a multiplier 57 without modification. The pilot extraction unit 54 outputs the extracted pilot signal to a divider 55. The divider 55 divides the pilot signal by a predetermined pilot symbol $D_{I1}$ to obtain a channel estimation value α. Then, the channel estimation value α is inputted to a complex conjugation unit 56, and the complex conjugate of α is calculated in the complex conjugation unit 56. The complex conjugate of α is inputted to a multiplier 57. In the multiplier 57, by multiplying the data series signal by the complex conjugate of α, the phase rotation due to fading of the data series signal is compensated for, and the phase-compensated data series signal is inputted to a RAKE combination unit 59. The signal, which is RAKE-combined in the RAKE combination unit 59, is inputted to a signal decision unit 60, and a signal value determined in the signal decision unit 60 is outputted. The pilot timing synchronization unit 58 detects the input timing of the pilot signals by counting using a built-in counter each time a signal value is inputted from the signal decision unit 60. Then, when the input timing of the pilot signal is detected, the pilot timing synchronization unit 58 outputs a synchronous signal to the pilot extraction unit 54, and enables the pilot extraction unit 54 to extract the pilot signal. In the case of a time-division multiplex pilot symbol system, a pilot symbol (pilot signal) is periodically transmitted from the transmitting side. Therefore, the number of data series signals between pilot symbols becomes a fixed value specified in the system.

In the case of FIG. 10, since a data series signal and a pilot signal are transmitted on the same carrier, there is no phase difference in a carrier between the data series signal and pilot signal. Accordingly, there is no need to correct the phase of a channel estimation value α.

Figure 11:
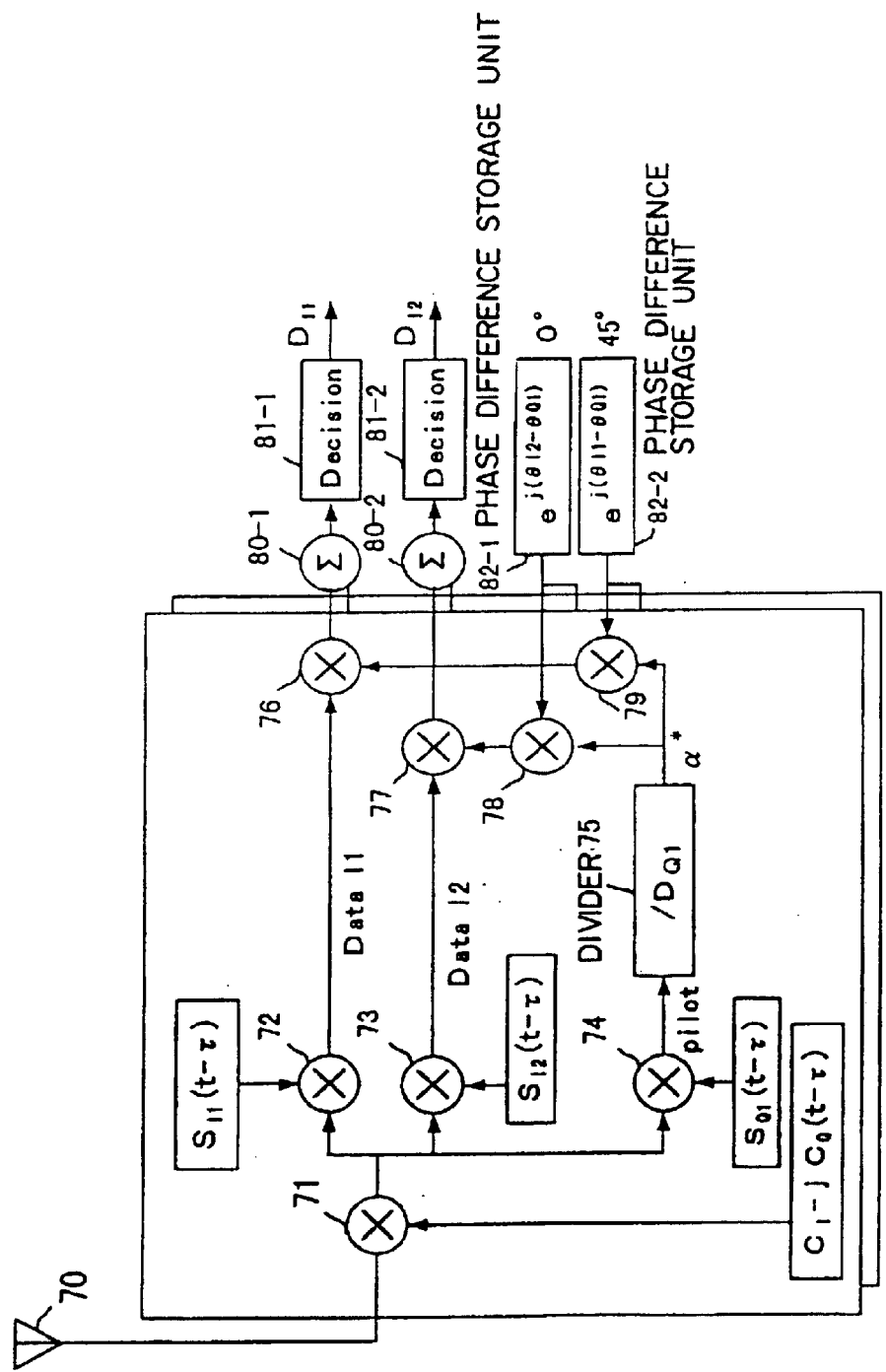
FIG. 11 shows the configuration of the preferred embodiment of a receiver in the case where pilot signals are transmitted on a channel different from a channel for data signals.

FIG. 11 shows the configuration of the preferred embodiment of a receiver in the case of a code multiplex pilot symbol system where a pilot signal is transmitted on a channel different from a channel for a data signal.

In the case of a code multiplex pilot symbol system where a pilot signal (pilot symbol) is spread using a spreading code different from a data series and is transmitted, if the phase of a carrier for modulating a pilot symbol and the phase of a carrier for modulating an information data series are made the identical for the same receiving station, a receiver with the same configuration as the conventional one (FIG. 10) can be used.

In the example configurations of the preferred embodiments, the phase of a carrier is matched with a spreading code. For example, the phase of a carrier for modulating information data series $D_{f1}$ and the phase of a carrier for modulating information data series $D_{f2}$ are assumed to be 0 and 45 degrees, respectively. And, data series $D_{Q1}$ is used as a pilot symbol, and the phase of a carrier for modulating this data series is also assumed to be 45 degrees.

With signals transmitted from such a system, if their spreading codes are known, the phase difference between their carriers corresponding to the spreading codes becomes known. As described above, since the phase difference between a carrier for modulating information data series $D_{f1}$ and a carrier for modulating data series $D_{Q1}$ is −45 degrees, and the phase difference between a carrier for modulating information data series $D_{f2}$ and a carrier for modulating data series $D_{Q1}$ is 0 degrees, as shown in FIG. 11, if phase compensation is performed using a estimation value α, which is the estimation result of the fluctuation parameter of a transmission line, with a phase that is rotated by −45 degrees for the demodulation of the information data series $D_{f1}$, and the estimation value α without phase rotation for the demodulation of the information data series $D_{f2}$ is set, the information data series $D_{f1}$ and $D_{f2}$ can be demodulated.

After being converted to a base band signal, a signal received by an antenna 70 is multiplied by scrambling codes ($c_I$+j$c_Q$) at an appropriate timing in a multiplier 71. Then, the signal with scrambling that is cancelled by multiplication (scrambling-cancelled signals) is branched and inputted to multipliers 72 and 73. In the multiplier 72, the scrambling-cancelled signal is multiplied by a spreading code I1, and as a result, data I1 is extracted. In the multiplier 73, the scrambling-cancelled signal is multiplied by a spreading code I2, and as a result, data I2 is extracted. In a multiplier 74, the scrambling-cancelled signal is multiplied by a spreading code Q1, and as a result, a pilot signal is extracted. The pilot signal is inputted to a divider 75, and in the divider 75, the pilot signal is divided by a known pilot symbol $D_{Q1}$, and a channel estimation value α, which is the divided value, is obtained.

The complex conjugate of the channel estimation value α generated by the complex conjugation unit 75, which is not shown in FIG. 11, is inputted to multipliers 78 and 79. The multipliers 78 and 79 multiply the complex conjugate by the phase difference correction value exp (j($\theta_{f2}-\theta_{Q1}$)) between a carrier for a pilot signal (pilot symbol) and a carrier for information data and information data series $D_{f1}$ and the phase difference correction value exp (j($\theta_{f1}-\theta_{Q1}$)) stored in phase difference storage units 82-1 and 82-2, respectively.

As a result, the phases of the complex conjugates of the channel estimation value α are rotated by ($\theta_{f2}-\theta_{Q1}$) and ($\theta_{f1}-\theta_{Q1}$) in multipliers 78 and 79, respectively.

In this way, the complex conjugates of the channel estimation value α with a phase difference between a carrier for information data series $D_{f1}$ and $D_{f2}$ and a carrier for a pilot signal (pilot symbol) provided on the transmitting side that is corrected, are outputted from the multipliers 79 and 78, and are inputted to multipliers 76 and 77. The data I1 and I2 are multiplied by the phase-corrected complex conjugates of the channel estimation value α in the multipliers 76 and 77, respectively, and their phase rotation due to fading are compensated for and are inputted to RAKE combination units 80-1 and 80-2, respectively. The data I1 and I2 RAKE-combined in the RAKE combination units 80-1 and 80-2 are inputted to signal decision units 81-1 and 81-2, respectively, and their signals are determined in the signal decision units 81-1 and 81-2, respectively, and the data are outputted as decided signal values $D_{f1}$ and $D_{f2}$.

In this way, the phase of a carrier is individually predetermined for each data series, data for correcting the phase difference between the phase of a carrier for information data series $D_{f1}$ and $D_{f2}$ and the phase of a carrier for a pilot signal (pilot symbol), which is data known on the receiving side, based on the phase information, are stored in the phase difference storage units 82-1 and 82-2, respectively, and the phase rotation due to the fading of received signals of information data series $D_{f1}$ and $D_{f2}$ are compensated for. By correcting the phase of the complex conjugate of a channel estimation value obtained from a received pilot signal using the phase difference correction data, if necessary, and using the corrected complex conjugate of the channel estimation value, the information data series $D_{f1}$ and $D_{f2}$ can be correctly received.

Although all the preferred embodiments described above are systems for scrambling data using a scrambling code and transmitting them, the present invention is not limited to this, and the present invention can also be applied to a code-division multiplex communications system in which scrambling using a scrambling code is omitted.

Although in the above-described preferred embodiments, componens, such as an amplifier installed in an actual circuit are not shown in the drawings, the components required in an actual circuit will be easily anticipated by a person having an ordinary skill in the art.

Since according to the present invention, both the amplitude fluctuation and the maximum amplitude value of a transmission signal can be suppressed, the present invention can contribute to the efficient operation of an amplifier. Since a low-power small amplifier can be used for an amplifier for transmitting transmission signals, the miniaturization of the apparatus can also be realized.

What is claimed is:

1. A receiving apparatus used in code-division multiplex communications where a plurality of data series are despread using a plurality of spreading codes and are received, wherein the plurality of data series are classified into two groups, and a phase of a carrier modulating one group of data series and a phase of a carrier modulating the other group of data series are set to 0 degrees and a prescribed phase value other than 0, respectively, comprising:

a despreading unit despreading received signals;
a pilot signal extraction unit extracting a pilot signal from an output signal of the despreading unit;
a channel estimation unit calculating a channel estimation value based on the pilot signal;

a phase difference information storage unit storing information about a phase difference between a carrier for information about the pilot signal and a carrier for information about the pilot signal and a carrier for a data signal outputted from the despreading unit in the channel estimation value; and a decision unit deciding a signal value of the data signal based on a process result of the data signal using both the channel estimation value and the phase difference information.

2. The receiving apparatus according to claim 1, wherein said decision unit judges signals obtained by RAKE-combining the signals after phase compensation.

3. The receiving apparatus according to claim 1, wherein the pilot signal is multiplexed by way of time-division together with the data signal 4. The receiving apparatus according to claim 1, wherein the pilot signal is code-multiplexed together with the data signal.

5. A receiving method used in code-division multiplex communications where a plurality of data series are despread using a plurality of spreading codes and are received, wherein the plurality of data series are divided into two groups, and a phase of a carrier modulating one group of data series and a phase of a carrier modulating the other group of data series are set to 0 degrees and a prescribed phase other than 0, respectively, comprising the steps of:

(a) despreading received signals;

(b) extracting a pilot signal from signals outputted in step (i);

(c) calculating a channel estimation value based on the pilot signal;

(l) storing information about a phase difference between a carrier for information about the pilot signal and a carrier for a data signal outputted in step (i) in the channel estimation value; and (m) judging a signal value of the data signal based on a process result of the data signal using both the channel estimation value and the phase difference information.

6. The receiving method according to claim 5, wherein steps (h) and (m) judge signals obtained RAKE-combining the signals after phase compensation.

7. The receiving method according to claim 5, wherein the pilot signal is multiplexed by way of time-division together with the data signal.

8. The receiving apparatus according to claim 5, wherein the pilot signal is code-multiplexed together with the data signal.

* * * * *